US006401067B2

(12) United States Patent
Lewis et al.

(10) Patent No.: US 6,401,067 B2
(45) Date of Patent: *Jun. 4, 2002

(54) SYSTEM AND METHOD FOR PROVIDING USER-DIRECTED CONSTRAINTS FOR HANDWRITING RECOGNITION

(75) Inventors: James R. Lewis, Delray Beach, FL (US); Michael P. Perrone, Yorktown, NY (US); John F. Pitrelli, Danbury, CT (US); Eugene H. Ratzlaff, Hopewell Junction; Jayashree Subrahmonia, White Plains, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,288

(22) Filed: Jan. 28, 1999

(51) Int. Cl.[7] .............................................. G10L 15/00
(52) U.S. Cl. ........................................ 704/275; 704/231
(58) Field of Search ................................. 704/231, 275, 704/270; 382/189, 229

(56) References Cited

U.S. PATENT DOCUMENTS

| 5,086,385 A | * | 2/1992 | Launey et al. ............... 364/188 |
| 5,386,494 A | * | 1/1995 | White ......................... 704/275 |
| 5,632,002 A | * | 5/1997 | Hashimoto et al. .......... 704/231 |
| 5,819,225 A | * | 10/1998 | Eastwood et al. ........... 704/275 |
| 5,943,395 A | * | 8/1999 | Hansen ........................ 379/52 |
| 6,167,376 A | * | 12/2000 | Ditzik ......................... 704/235 |
| 6,177,931 B1 | * | 1/2001 | Alexander et al. ........... 345/327 |

* cited by examiner

Primary Examiner—Marsha D. Banks-Harold
Assistant Examiner—Susan McFadden
(74) Attorney, Agent, or Firm—F. Chau & Associates, LLP (57) ABSTRACT

A data recognition system and method which allows a user to select between a "default recognition" mode and a "constrained recognition" mode via a user interface. In the default recognition mode, a recognition engine utilizes predetermined default recognition parameters to decode data (e.g., handwriting and speech). In the constrained recognition mode, the user can select one or more of a plurality of recognition constraints which temporarily modify the default recognition parameters to decode uncharacteristic and/or special data. The recognition parameters associated with the selected constraint enable the recognition engine to utilize specific information to decode the special data, thereby providing increased recognition accuracy.

19 Claims, 4 Drawing Sheets

SYSTEM AND METHOD FOR PROVIDING USER-DIRECTED CONSTRAINTS FOR HANDWRITING RECOGNITION

BACKGROUND

1. Technical Field

The present application relates generally to machine recognition and, more particularly, to system and methods for providing user-directed recognition constraints, wherein a user interface allows a writer to select one or more recognition constraints which temporarily modify default recognition parameters so as to decode uncharacteristic and/or special data with increased accuracy.

2. Description of the Related Art

In general, conventional machine recognition systems recognize input data by decoding the data using a plurality of trained models. For instance, speech recognition systems decode input speech utterances using trained speech models to recognize spoken words. Likewise, handwriting recognition systems recognize input handwriting data using trained character models to convert the handwriting data to machine printed text.

One example of a handwriting recognition system is the CROSSPAD™ personal digital notepad (PDN) device (marketed by the A.T. Cross Company) which is sold with International Business Machines Corporation's INK MANAGER™ handwriting text recognition software package. The CROSSPAD device allows a user to produce handwritten records on a standard paper notepad (which is placed over a digitizing tablet) using an electronic inking stylus (i.e., pen). A data stream representing the handwriting strokes is generated by the digitizing tablet (simultaneously with the inking) by detecting RF emissions from the stylus, thereby capturing and storing an electronic carbon copy of the handwritten record. The handwriting data that is electronically recorded by the CROSSPAD device can be subsequently uploaded to a computer and processed by the INK MANAGER system which is stored in the computer.

Typically, machine recognition of input data (e.g., speech or handwriting) is performed using predetermined default recognition parameters which are automatically applied by the recognition engine for decoding the input data. These default recognition parameters may be those default parameters which are originally programmed in the system (i.e., "out-of-the-box" default recognition parameters). In addition, the default recognition parameters may also comprise user-selected default recognition parameters (i.e., user preferences) which modify and/or replace the original out-of-the-box default parameters. For instance, handwriting recognition systems as the INK MANAGER system allow the user to initially indicate, for example, the user's normal style of writing (e.g., a user preference) prior to using the system. In particular, before using the INK MANAGER system, the user will be prompted to select (if the user desires) one of the following writing style preferences: pure discrete, pure upper case, and cursive (which includes all other handwriting such as printing and script mixed). During recognition, the INK MANAGER system will automatically apply any default parameters associated with a previously selected user preference. The INK MANAGER system includes other default settings to determine which, if any, word lists will be used for decoding handwriting.

In most situations, utilizing the default recognition parameters will result in optimal data recognition. In certain circumstances, however, utilizing the default recognition parameters may result in sub-optimal recognition accuracy. For example, with regard to handwriting recognition, such special circumstances occur when a user writes in an uncharacteristic manner (e.g., when a user writes an address using all capital letters rather than the user's typical style of writing addresses with printed mixed case). Decoding such uncharacteristic handwriting data using default recognition parameters can result in poor recognition accuracy.

There is a need, therefore, for a system and methods for use with machine recognition that allow a user to temporarily modify default recognition parameters by selecting one or more recognition constraints to decode uncharacteristic and/or special data so as to obtain increased recognition accuracy.

SUMMARY

The present application is directed to system and methods which can be implemented in a machine recognition device to provide a user (via a user interface) the option of selecting one of a plurality of recognition modes including a "default recognition" mode and a "constrained recognition" mode. In the default recognition mode, the recognition engine utilizes predetermined default recognition parameters (e.g., out-of-the-box and/or user-selected default parameters) to decode selected data. In the constrained recognition mode, the user can select one or more of a plurality of recognition constraints which are temporarily applied by a recognition engine for decoding uncharacteristic and/or special data. When the user selects a particular recognition constraint, default recognition parameters are temporarily modified to reflect the selected constraint. The recognition parameters associated with the selected constraint enable the recognition engine to temporarily utilize specific information for decoding the data, thereby providing increased recognition accuracy.

These and other features and advantages of the present system and method will become apparent from the following detailed description of preferred embodiments, which is to be read in connection with the accompanying drawings.

DETAILED DESCRIPTION OF PREFERRED EMBODIMENTS

It is to be understood that, notwithstanding that the illustrative embodiments herein are directed to handwriting recognition, the present invention may be implemented in other machine recognition applications such as speech recognition.

Figure 1:
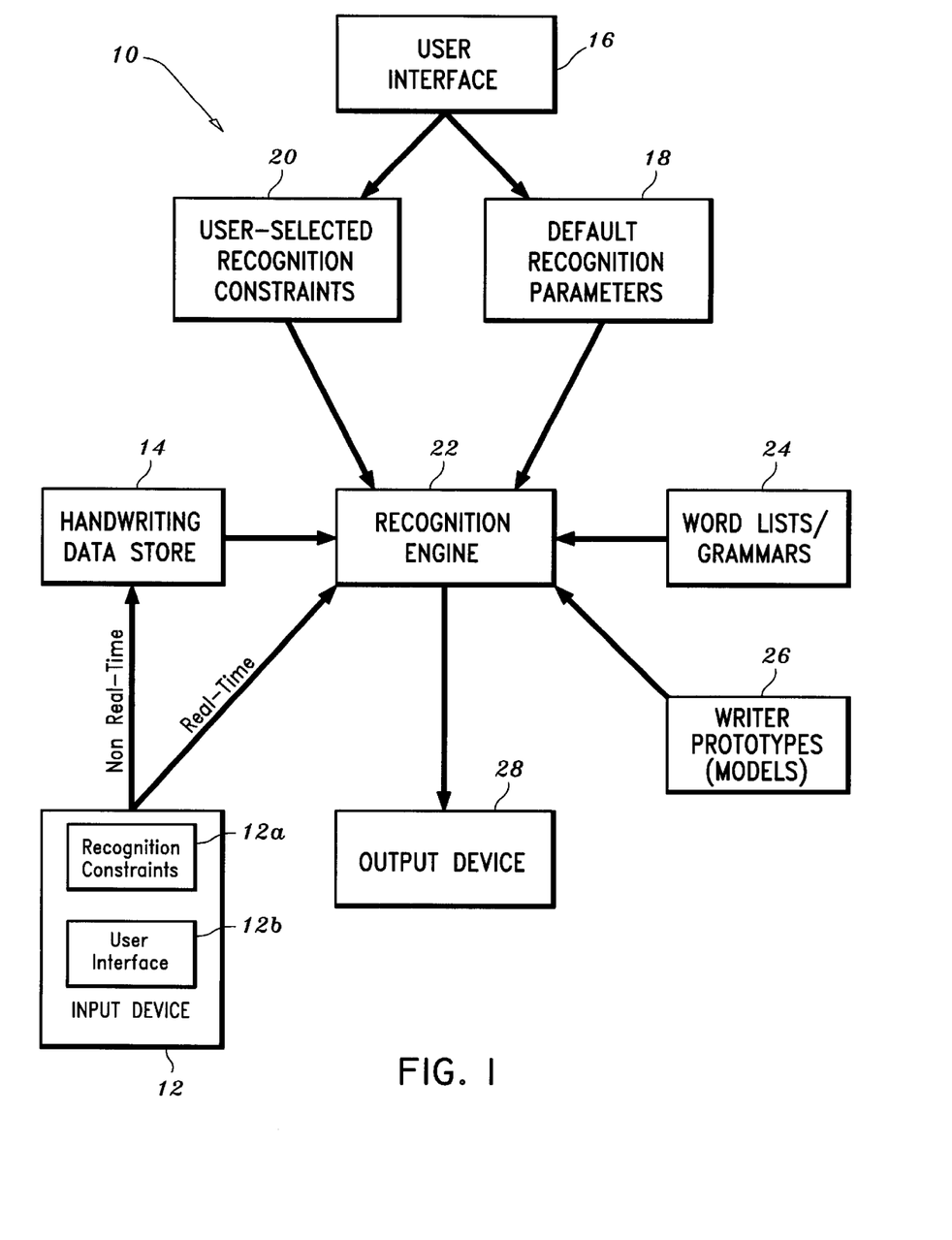
FIG. 1 is a block diagram of a handwriting recognition system which provides user-selected recognition constraints according to an embodiment of the present invention.

Referring now to FIG. 1, a block diagram illustrates a system for providing user-selected recognition constraints for handwriting recognition in accordance with an embodiment of the present invention. The system 10 includes an input device 12 (or "data collection device") for collecting data, e.g., handwritten text. The input device 12 can be any conventional device such as a digitizing tablet (i.e., pen-based computer) for real-time digitization and recognition of text which is directly written on the tablet, or an OCR (optical character recognition) scanner for inputting handwritten text. A memory 14 is included for storing handwriting data (hereinafter, alternatively referred to as "ink") which is input via the input device 12 for "non-real-time" processing. The ink may be stored in any suitable conventional format such as a bitmap image (which is typically generated with "off-line" OCR scanning, where "off-line" refers to recognition of handwriting that has already been written on paper using, e.g., a pencil or pen) or as a sequence of X-Y coordinates which represent the location of a pen writing tip on the input device 12 at successive points in time (which is generated with an "on-line" pen-based computer, where "on-line" refers to recognition of handwriting written with an electronic stylus onto a tablet or pen computer). It is to be understood that memory 14 may also be memory (such as flash memory) included within the input device 12 for storing the ink prior to being uploaded to, and decoded by, a handwriting recognition engine 22. It is to be appreciated that "real-time" recognition may also be performed by decoding handwriting data received by input device 12 as it is being collected by the input device 12.

The system 10 further includes a user interface 16 which may be, for example, a computer display having a suitable GUI (graphic user interface) which allows a user to perform handwriting recognition in accordance with the present invention. The user interface 16 provides the user with the option of selecting a "default recognition" mode, whereby predetermined default recognition parameters 18 are applied to the recognition engine 22. The user interface 16 also provides the user the option of selecting a "constrained recognition" mode, whereby the user can select one or more available recognition constraints 20 that are temporarily applied to the recognition engine 22. Specifically, the recognition constraints 20 present the user with task-oriented choices, the selection of which determines the recognition parameters that are temporarily utilized by the recognition engine 22 for decoding uncharacteristic and/or special text.

A word list/grammar store 24 contains a plurality of word lists and associated grammars which may be applied to the recognition engine 22 based on the selected recognition mode. Each word list may contain, for example, words or numbers that are associated with a particular application (e.g., for each of the available recognition modes), or even for particular fields in a data-entry tool. By way of example, a word list for telephone numbers may contain all the numeric characters, as well as hyphen and parentheses characters. In addition, a word list for in recognizing dates may contain years, months and days both numerically and in word form. A grammar is a constraint which may be applied in connection with a word list. By way of example, a grammar associated with a "date" word list may be employed to limit the order in which each data field of a date (e.g., month-day-year) can be recognized. In particular, when recognizing a handwritten date, the first field "month" of the grammar would constrain the universe of available words in the word list to those pertaining only to months, the second field "day" of the grammar would constrain the universe of words in the word list to days, and, likewise, the third field "year" of the grammar would constrain the universe of allowable words in the word list solely to years.

A writer prototypes store 26 contains one or more writer prototypes (models). Each writer prototype contains one or more sets of character models (e.g., upper case character model, lower case character model). It is to be understood that the system of FIG. 1 presumes a trained handwriting recognition system. The trained recognition system may be a writer-independent system (i.e., a system which is trained to recognize the handwriting of many different writers), in which case the writer prototypes store may contain a writer-independent prototype (model). Alternatively, the recognition system may be a writer-dependent recognition system (i.e., a system trained to recognize the handwriting of a particular writer), in which case the writer prototypes store 26 may contain one or more writer-dependent prototypes, as well as a writer-independent prototype.

The recognition engine 22 will decode handwriting data using recognition parameters associated with the selected recognition mode. For example, if a user selects the default recognition mode to decode the user's handwriting, predetermined default recognition parameters (which can be out-of-the-box or user-specific default constraints (user preferences) as discussed above) are temporarily applied to the recognition engine. For instance, assume the user's default constraints (e.g., user preference) indicate that the user writes in cursive and that the writer-dependent prototype of the user is trained on cursive data. In the default recognition mode, the recognition engine 22 will decode the user's handwriting data using the writer-dependent prototype 26 associated with the user, as well as the relevant default word lists/grammars 24, regardless of whether the handwriting to be decoded includes upper case letters or numbers. This may result in decreased recognition accuracy.

On the other hand, if the user selects the "constrained recognition" mode, the recognition constraint(s) selected by the user will temporarily modify the predetermined default recognition parameters utilized by the recognition engine 22 and/or cause one or more relevant word lists/grammars to be retrieved from the word list/grammar store 24. For example, one type of constraint may cause the recognition engine 22 to temporarily utilize a particular writer-prototype 26 or use a particular character set (e.g., upper case character model) of a given writer prototype ("model constraint"). For instance, assume in the above example that the user (whose user preference indicates cursive writing) has written in upper case. The user can override his/her user preference by selecting an "upper case" model constraint. In this situation, assuming the user's writer-dependent prototype does not include an upper case character model, the selected "upper case" constraint may cause the recognition engine 22 to "swap out" the writer-dependent prototype for the writer-independent prototype and apply an upper case model included within the writer-independent prototype to decode the special text.

Another type of constraint may cause the recognition engine 22 to temporarily utilize a specific word list/grammar 24 during decoding ("word list constraint"). For instance, assume further (in the above example) that the handwriting data of the user contains one or more written dates. A word list constraint may be selected for decoding the written dates, whereby the recognition engine 22 applies the "dates" word list so as to constrain the universe of allowed words to the words contained in such word list. In this example, the selected word list constraint causes the writer's user preference to be adjusted (constrained) and not overridden.

Another type of constraint may be temporarily applied to limit the types of characters which may be recognized ("character set constraint"). For instance, if certain characters for a particular field or word type can only be, for example, letters "a" "b" or "c" or numbers "1", "2" or "3," a character set constraint may be selected to limit the characters which may be recognized for the field or word type.

Another type of recognition constraint may cause the recognition engine 22 to temporarily modify or adjust the default decoding algorithm and/or a specific parameter of the decoding process ("decoding algorithm constraint"). For instance, if the handwriting data contains a plurality closely written words, a constraint may be selected to modify the process by which the recognition engine 22 detects spaces, and thereby differentiates, between different words. Advantageously, the recognition constraints allow the recognition engine 22 to achieve higher decoding accuracy when recognizing handwriting data comprising special and/or uncharacteristic text. The decoding results of the system are output via the output device 28 (which may be a computer monitor or printing device).

Figure 4A:
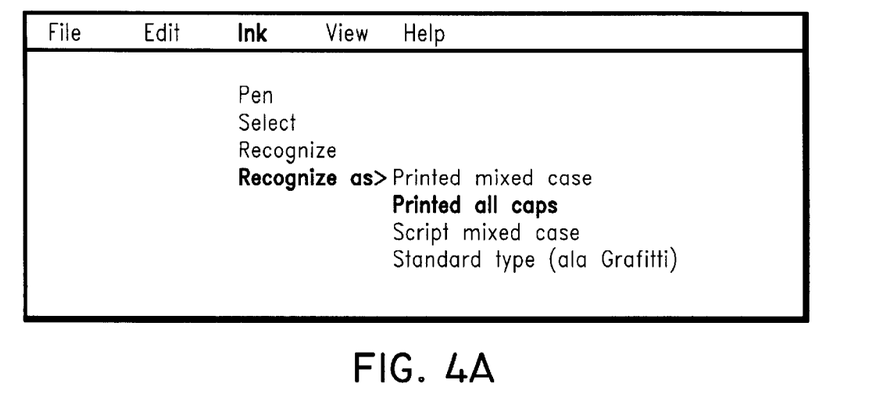
FIGS. 4a and 4b are diagrams of exemplary cascading menus for providing handwriting recognition constraints in accordance with one aspect the present invention.
Figure 4B:
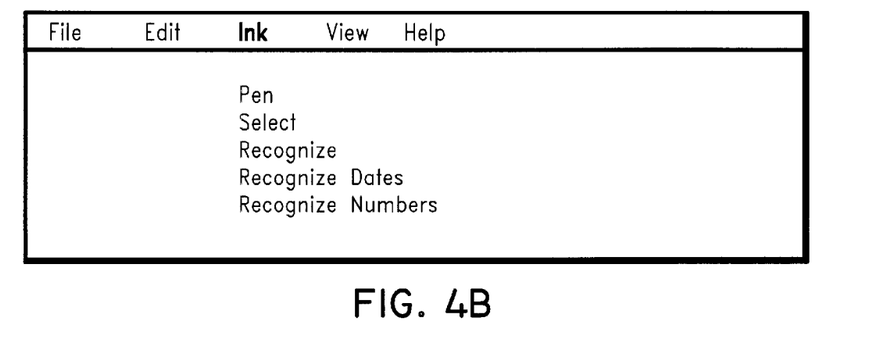
Figure 5:
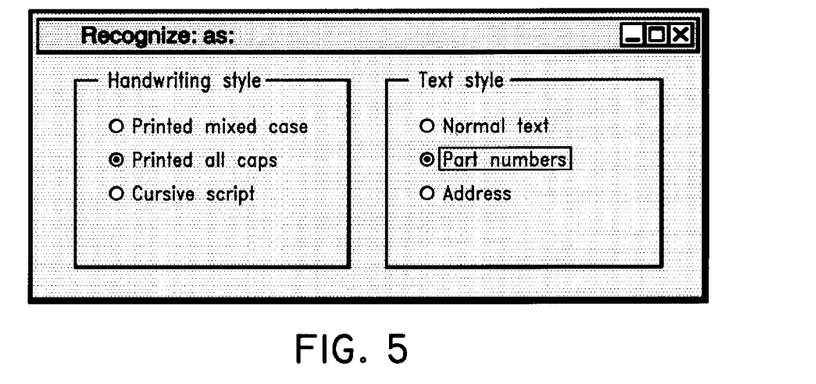
FIG. 5 is a diagram of an exemplary dialog for selecting recognition constraints in accordance with one aspect of the present invention.

Referring now to FIGS. 4a, 4b and 5, diagrams illustrate several examples of user interfaces which may be utilized for handwriting recognition in accordance with the present invention. In particular, FIG. 4a illustrates one embodiment of a GUI comprising a cascading menu for selecting one or more available recognition constraints in the handwriting recognition system of the present invention. A recognition menu option (e.g., "Ink") may be selected from a menu bar (or toolbar) to provide recognition functions. Such functions include, for instance, a menu function for allowing a user to mark the desired text to be recognized (e.g., "Select"), a menu function (e.g., "Recognize") for selecting the default recognition mode, and a menu function (e.g., "Recognize as") for selecting the constrained recognition mode, which cascades to a set of recognition constraints (e.g., "printed mixed case," "printed all caps," etc. as shown in FIGS. 4a).

Another embodiment for the GUI interface is illustrated in FIG. 4b., which is similar to the GUI of FIG. 4a except that rather than displaying the recognition constraint menu items as a second pull down (i.e., cascade), the recognition options (e.g., "Recognize Dates") are displayed at the same level in the menu hierarchy as the default recognition mode (e.g., "Recognize"). menu item. A further embodiment of the GUI in accordance with the present invention is illustrated in FIG. 5, wherein a dialog box is produced (in response to selecting the constrained recognition mode) which allows the user to make easily understood choices. Advantageously, the GUI utilized in accordance with the present invention allows even a computer-naive user to easily find and select one or more of the available recognition constraints.

It is to be appreciated that the selection of desired recognition constraints may also be implemented via the input device 12. For example, with the CROSSPAD/INK MANAGER system described above, rather than decoding all the uploaded handwriting data at once, the user can mark (or select, highlight) specific handwritten text using the CROSSPAD device (as well as the INK MANAGER system), and then subsequently direct the INK MANAGER system to recognize the marked text. Specifically, as shown in FIG. 1, the input device 12 (e.g., CROSSPAD) contains a user interface 12b which allows a user to mark (or select) certain ink and "tag" (or label) selected recognition constraints 12a to the marked ink. The user interface 12b of the input device 12 may comprise, for example, an LCD display which displays 2 to 3 lines of text to indicate the state of the device or provide menu options for performing various functions such as selecting ink and labelling the selected ink with desired recognition constraints. Advantageously, the user can "tag" (label) the selected ink with desired recognition constraint, store the "tagged" ink in memory 14, and upload the "tagged" ink to the recognition engine 22 for processing at a later time.

Another example for illustrating user-selected recognition constraints will now be discussed with reference to FIG. 5. Assume the user has written down a set of part numbers for an inventory and wants them to be recognized. Assume further that, following the user's typical convention, the user has written the alphabetic portions of the part numbers using uppercase print. This special case can be addressed by adding, for example, a "Part numbers" menu item as one of the "text style" options shown in the dialog user interface of FIG. 5. In this case, the selected handwriting would be decoded using the writer-independent models for interpreting text printed as all caps, the system may retrieve the word list 24 which corresponds the target text being identified as part numbers. Furthermore, additional "text style" options (such as "Address" and "Normal text") would allow a user to apply the available "handwriting styles" menu items (shown for example in FIG. 5) so as to realize a more specific task-oriented recognition of particular handwriting.

It is to be understood that the various recognition constraints illustrated in the GUI interfaces of FIG. 4a, 4b and 5 are not meant to exhaustively list all possible handwriting styles and text types, nor all the possible classes of constraints that may be available for selection by a user. For example, text styles could be extended to include other types of text, such as numbers-only or symbols. The recognition constraints may include other types of constraints such as "left-handed" and "right-handed" constraints, as well as "paper ruling" constraints to provide information regarding the vertical spacing between lines on a piece of paper (which is used in conjunction with the CROSSPAD discussed above). Other type of constraint categories, such as Field Description, could include items such as dates, URLS, math, e-mail, addresses, social security numbers, phone numbers, zip codes, state abbreviations, and numerous other possibilities that one of skill in the art may envision. Since the universe of potential recognition constraints that may be utilized is virtually limitless (except for practical considerations), the term "recognition constraints" as used herein refers, collectively, to the universe of all possible constraints. In particular, the term "recognition constraint" as used herein refers to any generic type of handwriting that has some feature which distinguishes it from other types of writing.

It is to be further understood that the system and methods described herein may be implemented in various forms of hardware, software, firmware, or a combination thereof. In particular, the present invention is preferably implemented in software as an application program which is executed on a general purpose computer having any suitable and preferred microprocessor architecture. It is to be further understood that because some of the elements of the present system are preferably implemented as software modules (such as the recognition engine 22) the actual connections shown in FIG. 1 may differ depending upon the manner in which the system is programmed. Of course, special purpose microprocessors may be employed to implement the present system. Given the teachings herein, one of ordinary skill in the related art will be able to contemplate these and similar implementations or configurations of the present invention.

Preferably, the system and methods described herein are implemented on a computer platform including hardware such as one or more central processing units (CPU), a random access memory (RAM), and input/output (I/O)

interface(s). The computer platform also includes an operating system and microinstruction code. The various processes and functions described herein may be either part of the microinstruction code or application programs which are executed via the operating system. In addition, various other peripheral devices may be connected to the computer platform such as an additional data storage device and a printing device.

Figure 2:
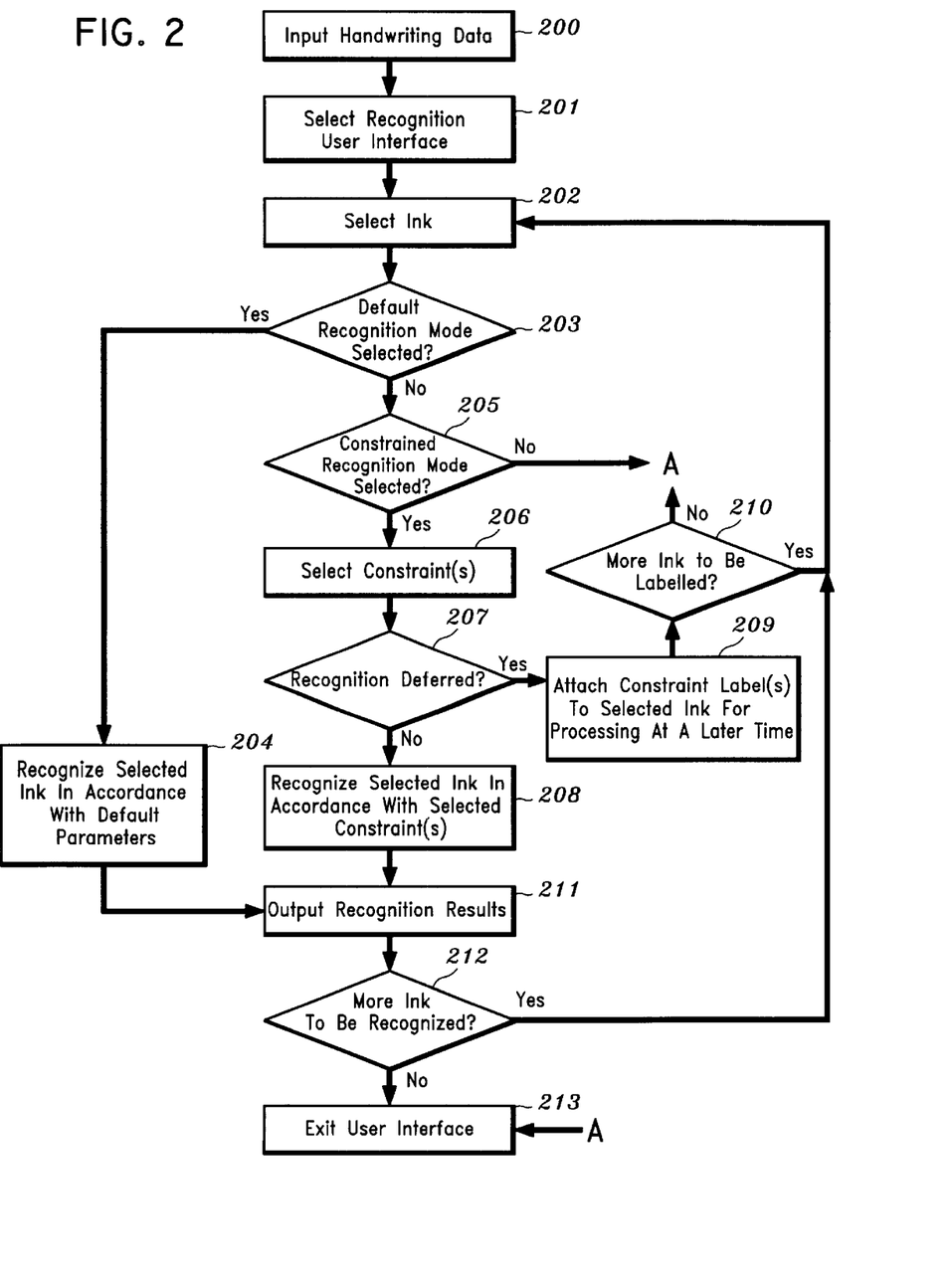
in FIG. 2 is a flow diagram of a method for selecting and applying recognition constraints in accordance with one aspect of the present invention.

Various methods of operation of the system shown in FIG. 1 will now be discussed in detail with reference to the flow diagrams of FIGS. 2 and 3. In particular, the flow diagram of FIG. 2, illustrates a "one shot" method for selecting recognition modes, wherein selected recognition constraints are applied to marked ink only once and then reset, thereby allowing the user to select different recognition constraints for subsequently marked text. On the other hand, the method illustrated in FIG. 3 implements a "sticky constraint", wherein a selected recognition constraint is set and applied to all marked ink until the user selects another recognition constraint.

Referring now to FIG. 2, initially, the handwriting data will be collected by, and uploaded from, the input device 12 (step 200). Next, the user will select the "recognition" user interface when the user desires to perform machine recognition of the uploaded handwriting data (step 201). For example, as illustrated in FIGS. 4a and 4b, the user would select the "Ink" menu (or toolbar button) to provide the initial recognition options. Next, the user will select (or mark) the ink to be recognized (step 202) via the "Select" option shown in FIGS. 4a and 4b, for example, or any other suitable menu option which allows a user to select the text to be recognized. Next, the user will select either the "default recognition" mode (step 203) or the "constrained recognition" mode (step 205) from the displayed recognition menus. If the "default recognition" mode is selected (affirmative result in step 203) (via the "Recognize" menu item shown in FIGS. 4a and 4b, for example), then the recognition engine 22 (FIG. 1) will decode the selected ink using the default recognition parameters 26 (step 204). After default recognition is finished, the recognition results are output (step 211).

On the other hand, the user can select the "constrained recognition" mode (affirmative result in step 205) (via the "Recognize as" menu item shown in FIGS. 4a and 4b, for example). The user will then be presented with a list of available "recognition constraints" and the user will select one or more desired constraints (step 206). After the user selects the desired constraint(s), a determination is made as to whether recognition of the selected ink is deferred (step 207). In particular, the system provides the user the option (e.g., via a menu or tool bar item or default setting) of selecting between having the selected ink recognized immediately (step 208) or having recognition deferred to a later time (step 209).

If recognition is not deferred (negative determination is step 207), the selected ink will be recognized in accordance with the selected constraints (step 208) and the recognition results will be output (step 211). If the user wants additional ink recognized (affirmative result in step 212), the user will select the desired ink (return to step 202) and the recognition process may be repeated for the newly selected ink (steps 203, 204 and 211 or steps 205, 206, 208, and 211).

On the other hand, if recognition is deferred (affirmative determination in step 207), the selected ink will be tagged with one or more labels associated with the selected constraint(s) that are to be applied during subsequent recognition (step 209). If the user wants to label additional ink for subsequent recognition (affirmative result in step 210), the user will select the desired ink (return to step 202) and the labelling process will be repeated for the newly selected ink (steps 205, 206, and 209). Accordingly, in the "one shot" method of FIG. 2, after the selected ink is either labelled (step 209) or recognized (step 208), since the selected recognition constraints are applied to marked ink only once and then reset, the user must actively select a desired recognition mode for subsequently marked ink.

Figure 3:
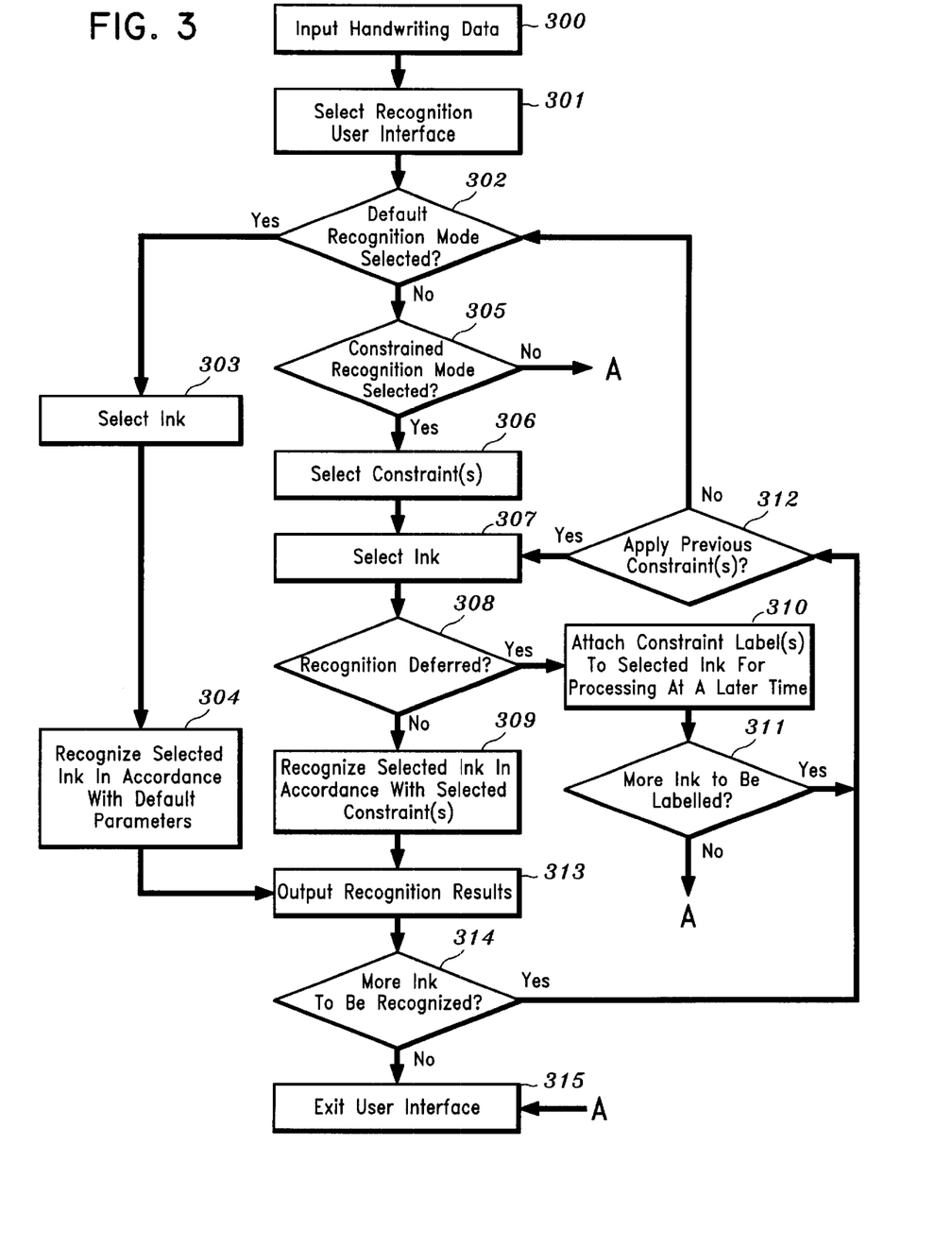
FIG. 3 is a flow diagram of a method for selecting and applying recognition constraints in accordance with another aspect of the present invention.

Referring now to FIG. 3, a method for selecting recognition modes in accordance with another aspect of the present invention is shown. Initially, the handwriting data will be collected by, and uploaded from, the input device 12 (step 300). Next, the user will select the "recognition" user interface when the user desires to perform machine recognition of the uploaded ink (step 301). Next, the user will select either the "default recognition" mode (step 302) or the "constrained recognition" mode (step 305) from the displayed recognition menus. If the "default recognition" mode is selected (affirmative result in step 302), the user will select (or mark) the ink to be recognized (step 303), and the recognition engine 22 will decode the selected ink using the default recognition parameters 26 (step 304). After default recognition is finished, the recognition results are output (step 313).

On the other hand, if the "constrained recognition" mode is selected (affirmative result in step 305), the user will then be presented with a list of available recognition constraints, and the user will select one of more of the constraints (step 306). After the user selects the desired constraint(s), the user will select the ink to which the constraints are then applied for recognition (step 307). A determination is then made as to whether recognition of the selected ink is deferred (step 308).

If recognition is not deferred (negative determination is step 308), the selected ink will be recognized in accordance with the selected constraints (step 309) and the recognition results will be output (step 313). If the user wants additional ink recognized (affirmative in result in step 314) using the previously selected constraints (affirmative result in step 312), the user will select the desired ink (return to step 307) and the recognition process will be repeated for the selected ink using the previously selected constraints (steps 309 and 313). In this manner, a "sticky constraint" is applied to each ink selection.

On the other hand, if the user wants to recognize additional ink (affirmative result in step 314) but does not want to apply the previously selected constraint(s) (negative result in step 312), the user may select either the default recognition mode (step 302) or the constrained recognition mode and desired constraints (steps 305 and 306) before selecting additional ink (steps 303 and 307, respectively).

If recognition is deferred (affirmative determination in step 308), the selected ink will be tagged with the label associated with the selected constraint(s) (step 310). If the user wants to label additional ink (affirmative result in step 311), using the previously selected constraint(s) (affirmative result in step 312), the user will select the desired ink (step 307) and repeat the labelling process (step 310). In this manner, the user can apply the same recognition constraint(s) to a plurality of ink selections. On the other hand, if the user wants to label additional ink with different constraints (affirmative result in step 311 and negative result in step 312), the user may select another constraint (steps 305 and 306) selecting additional ink (step 307), and then label the selected ink with the new constraint (step 310).

In summary, the illustrative embodiments described above may be implemented in any handwriting recognition system to afford a user the option of selecting specific recognition constraints to provide increased recognition accuracy for decoding uncharacteristic handwriting styles or text. The exemplary user interfaces described above facilitate the selection of such recognition constraints by allowing a user to readily find and select the available recognition options.

It is to be appreciated that the present system and methods may be employed in other machine recognition applications to allow a user to select certain recognition constraints for decoding data, notwithstanding that the illustrative embodiments herein are directed to handwriting recognition. For instance, the present invention may be implemented in a speech recognition system in which the user interface provides a user the option of performing constrained speech recognition. Such constraints may include, for example, the option of selecting between adult/child and male/female speech models or selecting special vocabularies (i.e., word lists) for scientific, legal, and medical applications. One of ordinary skill in the art could envision additional constraints which may be applied in speech recognition applications.

With regard to speech recognition, using methods well-known to those skilled in the art, the input utterances (spoken words) are initially processed by extracting spectral features to produce a plurality of feature vectors which, typically, represent the envelope of the speech spectrum. Each feature vector is computed for a given frame (or time interval) of the digitized speech, with each frame representing, typically, 10 ms to 30 ms of the digitized speech. In addition, each feature vector includes "n" dimensions (parameters) to represent the sound within the corresponding time frame.

In accordance with an illustrative embodiment discussed above, after the feature data is extracted from the input utterances, the feature data may be decoded using speech models (and default recognition parameters) and the decoding results (i.e., the machine text representing the decoded feature data) is displayed. Thereafter, the displayed text can be selected by the user and decoded once again using one or more selected recognition constraint to achieve increased recognition accuracy. In particular, the frames of feature data which are aligned to, and associated with, the selected text can either be re-decoded using the selected recognition constraints or labelled with the selected constraints for re-decoding at a subsequent time.

Alternatively, in accordance with another illustrative embodiment discussed above, the user can select one or more recognition constraints which are applied in the first instance for performing recognition. Moreover, it is to be understood the input utterances can be recorded and processed using the input device 12 (FIG. 1), and/or subsequently uploaded to a remote speech recognition system for further processing.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A machine recognition system, comprising:

an input device nor receiving input data;

a user interface comprising a menu for selecting at least one of a plurality of recognition modes comprising a default recognition mode and a constrained recognition mode, wherein the constrained recognition mode enables a user to select one or more recognition constraint options, the recognition constraint options comprising a decoding algorithm constraint that can be selected to modify one of a decoding method, a decoding parameter or both;

selection means for allowing a user to select a portion the input data for recognition;

a recognition engine for recognizing the selected input/data using recognition parameters associated with the selected recognition mode; and an output device for outputting recognition results.

2. The system of claim 1, wherein the machine recognition system is a speech recognition system and the input data is acoustic speech utterances.

3. The system of claim 1, wherein the machine recognition system is a handwritten text recognition system and the input data is handwriting data.

4. The system of claim 1, further comprising:

word list storage means for storing at least one word list; and prototype storage means for storing at least one prototype, wherein said recognition means retrieves one of a word list, a prototype and a combination thereof, corresponding to the selected recognition mode for performing recognition.

5. The system of claim 1, wherein said selection means includes means for tagging the selected input data with a label corresponding to the selected recognition mode.

6. The system of claim 5, wherein the selection means is included within said input device.

7. A program storage device readable by a machine, tangibly embodying a program of instructions executable to perform method steps for recognizing input data in accordance with a user-selected recognition mode, the method steps comprising:

receiving the input data;

displaying a menu having a plurality of recognition mode menu options for selection by a user, the menu options comprising a default recognition mode find a constrained recognition mode, wherein the constrained recognition mode enables a user to select one or more recognition constrain options, the recognition constraint options comprising a decoding algorithm constraint that can be selected to modify one of a decoding method, a decoding parameter or both;

selecting at least a portion of the input data for recognition in accordance with the selected recognition mode; and recognizing the selected input data using recognition parameters associated with the recognition mode selected by the user.

8. The program storage device of claim 7, wherein the machine is a speech recognition device and the input data is acoustic speech utterances.

9. The program storage device of claim 7, wherein the machine is a handwritten text recognition device and the input data is handwriting data.

10. The program storage device of claim 7, further including instructions for performing the step of retrieving one of a corresponding word list and a corresponding prototype and a combination thereof in response to the selected recognition mode, wherein recognition is performed using the retrieved word list and writer prototype.

11. The program storage device of claim 7, further including instructions for performs the steps of:
    displaying a plurality of recognition constraints for selection by the user if the user selects the constrained recognition mode; and
    modifying default recognition parameters in accordance with at least one selected recognition constraint.

12. The program storage device of claim 7, further including instructions for performing the step of:
    resetting the selected recognition mode after recognition of the selected portion of input data.

13. The program storage device of claim 12, further including instructions for performing the steps of:
    causing recognition of the selected portion of input data to be deferred at a subsequent time in response to a user request;
    tagging the selected portion of input data with a label corresponding to the selected recognition mode; and
    performing recognition of the selected portion of input data at the subsequent time in accordance with the recognition mode corresponding to the label.

14. The program storage device of claim 11, wherein recognition of the selected portion of input data is performed after the step of selecting the recognition mode.

15. The program storage device of claim 11, further including instructions for performing the step of:
    performing recognition of subsequently selected portions of the input data in accordance with the selected recognition mode until a new recognition mode is selected, wherein recognition of additionally selected portions of the input data is performed in accordance with the newly selected recognition mode.

16. The program storage device of claim 11, further including instructions for performing the steps of:
    causing recognition of the selected input data to be deferred at a subsequent time in response to a user request;
    tagging the selected portion of input data with a label corresponding to the selected recognition mode; and
    performing recognition of the labeled portion of input data at the subsequent time in accordance with the recognition mode corresponding to the label.

17. The program device of claim 16, further including instructions for performing the step of tagging subsequently selected portions of input data with the previously selected recognition mode until a new recognition mode is selected, wherein additionally selected portions of the input data are tagged with a label corresponding to a newly selected recognition mode after selection of the new recognition mode.

18. A method for decoding handwriting data in a handwritten text recognition system, comprising the steps of:
    displaying handwriting data;
    selecting between one of a default recognition mode and a constrained recognition mode the constrained recognition mode having a plurality of recognition constraints associated therewith, the recognition constraints comprising a character set constraint that constrains characters that are recognized;
    recognizing a user-selected portion of the displayed handwriting data in accordance with default recognition parameters if the default recognition mode is selected for the user-selected portion; and
    selecting at least one of the plurality of recognition constraints if the constrained recognition mode is selected and recognizing the user-selected portion of the displayed handwriting data in accordance with recognition parameters associated with the recognition constraint selected for the user-selected portion.

19. A method for decoding speech data in a speech recognition system, comprising the steps of:
    receiving input speech data and processing the input speech data in successive frames;
    decoding the processed speech data using default recognition parameters and outputting the decoding results;
    selecting at least a portion of the decoding results;
    selecting at least one of a plurality of recognition constraints;
    recognizing the processed input speech data corresponding to the selected portion of decoding results in accordance with the selected recognition constraint.

* * * * *

UNITED STATES PATENT AND TRADEMARK OFFICE
CERTIFICATE OF CORRECTION

PATENT NO. : 6,401,067 B2
DATED : June 4, 2002
INVENTOR(S) : James R. Lewis et al.

It is certified that error appears in the above-identified patent and that said Letters Patent is hereby corrected as shown below:

Column 10,
Line 3, the word "nor" should read -- for --;
Line 13, the word -- of -- should be inserted after the word "portion";
Line 15, the phrase "input/" should read -- input --;
Line 41, the phrase -- by the machine -- should be inserted after the word "executable";
Line 48, the word "find" should read -- and --; and Column 11,
Line 6, the word "performs" should read -- performing --.

Signed and Sealed this

Fifth Day of November, 2002

Attest:

JAMES E. ROGAN
Attesting Officer
Director of the United States Patent and Trademark Office